(12) United States Patent
Oberai et al.

(10) Patent No.: US 12,579,637 B1
(45) Date of Patent: Mar. 17, 2026

(54) CREATING SCANNING PLANS FOR IMPROVING ACCURACY AND RESOLUTION OF OPTICAL WAFER INSPECTION

(71) Applicant: Synopsys, Inc., Mountain View, CA (US)

(72) Inventors: Ankush Bharati Oberai, Fremont, CA (US); Rajesh Ramesh Sahani, Mumbai (IN); Shivraj Bhagwat Patil, Mumbai (IN)

(73) Assignee: SYNOPSYS, INC., Sunnyvale, CA (US)

( * ) Notice: Subject to any disclaimer, the term of this patent is extended or adjusted under 35 U.S.C. 154(b) by 458 days.

(21) Appl. No.: 18/187,355

(22) Filed: Mar. 21, 2023

(51) Int. Cl.
| | |
|---|---|
| *G06T 7/00* | (2017.01) |
| *G01N 21/95* | (2006.01) |
| *G06T 7/70* | (2017.01) |

(52) U.S. Cl.
CPC ......... G06T 7/001 (2013.01); G01N 21/9505 (2013.01); G06T 7/70 (2017.01); *G06T 2207/30148* (2013.01)

(58) Field of Classification Search
CPC ... G06T 7/001; G06T 7/70; G06T 207/30148; G01N 21/9505
See application file for complete search history.

(56) References Cited

U.S. PATENT DOCUMENTS

| | | | | |
|---|---|---|---|---|
| 11,106,035 | B2 * | 8/2021 | Wieczorek | ............ H04L 67/131 |
| 2013/0279790 | A1 * | 10/2013 | Kaizerman | ............. G06T 7/001 |
| | | | | 382/144 |
| 2019/0086340 | A1 * | 3/2019 | Leu | ..................... G01N 21/8851 |
| 2019/0258225 | A1 * | 8/2019 | Link | .......................... G06T 7/70 |
| 2021/0192116 | A1 * | 6/2021 | Oberai | .................. G06F 30/398 |
| 2021/0406441 | A1 * | 12/2021 | Oberai | .................... G06F 30/27 |

FOREIGN PATENT DOCUMENTS

| | | | | |
|---|---|---|---|---|
| TW | 202006848 A | * | 2/2020 | ........... G06F 30/398 |

* cited by examiner

*Primary Examiner* — Samir A Ahmed
(74) *Attorney, Agent, or Firm* — Laxman Sahasrabuddhe; Park, Vaughan, Fleming & Dowler LLP

(57) ABSTRACT

A circuit design may be partitioned into a set of regions. Regions in the set of regions that are substantially identical to one another may be identified and overlaps between the set of regions may be determined. A scanning plan may be created based on the set of regions, the regions in the set of regions that are substantially identical to one another, and the overlaps between the set of regions. The scanning plan may be provided to an OWI system which inspects a set of dies fabricated based on the circuit design. A scan result may be received from the OWI system based on inspecting a die in the set of dies. A defect location in the die may be identified based on the scan result and the scanning plan.

15 Claims, 8 Drawing Sheets

May be performed
once for each
circuit design

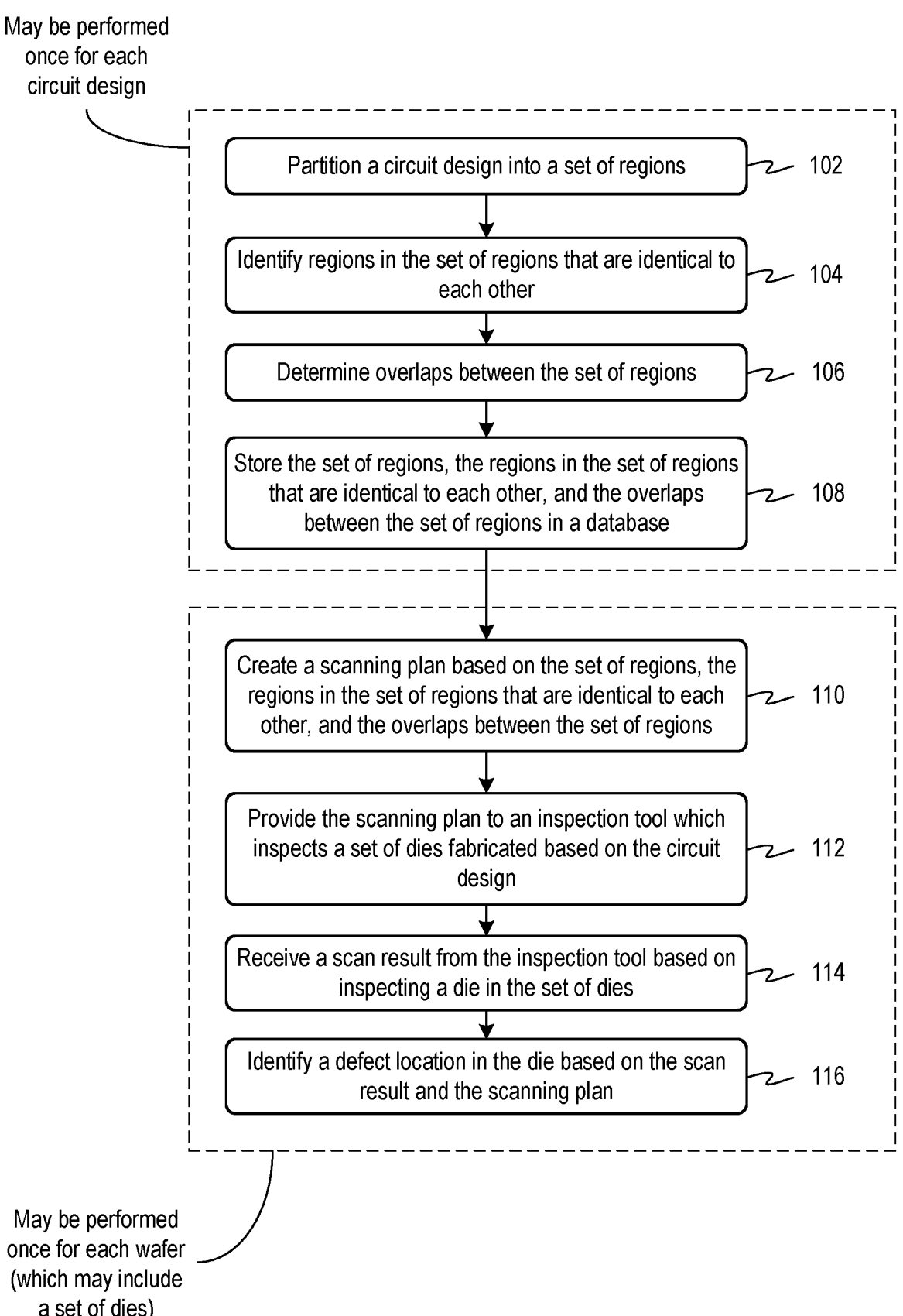

Partition a circuit design into a set of regions — 102

Identify regions in the set of regions that are identical to each other — 104

Determine overlaps between the set of regions — 106

Store the set of regions, the regions in the set of regions that are identical to each other, and the overlaps between the set of regions in a database — 108

Create a scanning plan based on the set of regions, the regions in the set of regions that are identical to each other, and the overlaps between the set of regions — 110

Provide the scanning plan to an inspection tool which inspects a set of dies fabricated based on the circuit design — 112

Receive a scan result from the inspection tool based on inspecting a die in the set of dies — 114

Identify a defect location in the die based on the scan result and the scanning plan — 116

May be performed
once for each wafer
(which may include
a set of dies)

FIG. 1

Region
206

Circuit design
202

Region
208

Store information
about identical regions
and overlaps in a
database

Database
204

Region
306

Region
308

Die
304

Wafer
302

Patterns
400

Patterns
400

Patterns
400
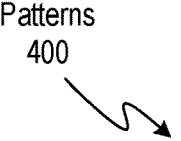
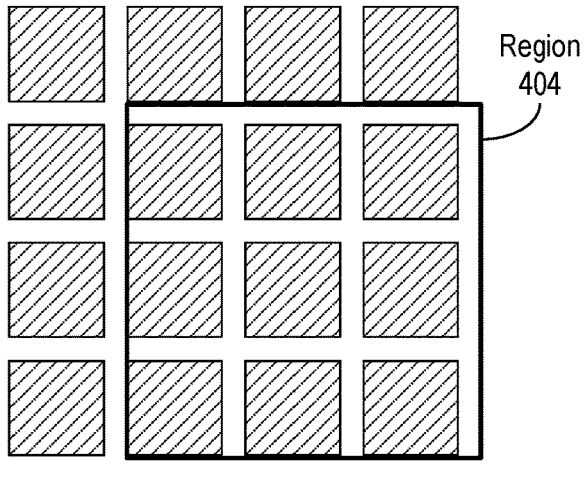
Region
404
FIG. 4C
Patterns
400
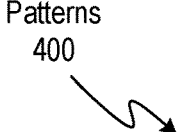
Region
406
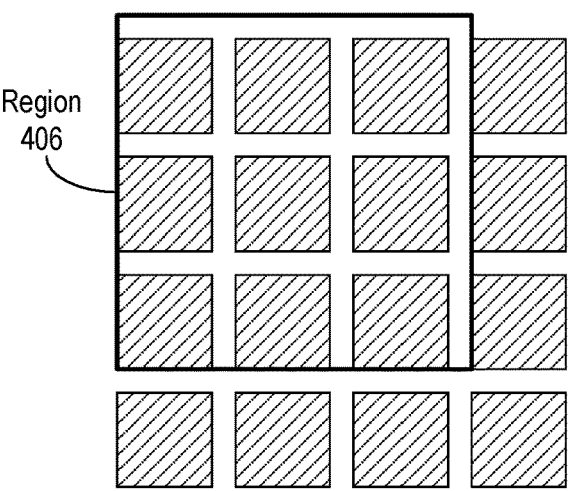
FIG. 4D

Patterns
400

Region
408

Patterns
400

Defect
location
410

Region 502

Region 506

Region 504

Region 508

Defect location 510

600

CREATING SCANNING PLANS FOR IMPROVING ACCURACY AND RESOLUTION OF OPTICAL WAFER INSPECTION

TECHNICAL FIELD

The present disclosure generally relates to integrated circuit (IC) design and manufacturing. More specifically, this disclosure relates to creating scanning plans for improving accuracy and resolution of optical wafer inspection (OWI).

BACKGROUND

When an IC is manufactured based on an IC design, defects (if any) in the IC may be detected using OWI. Specifically, an OWI system may scan one or more areas of a wafer and report defect locations.

SUMMARY

A circuit design may be partitioned into a set of regions. Regions in the set of regions that are substantially identical to one another may be identified. Overlaps between the set of regions may be determined. A scanning plan may be created based on the set of regions, the regions in the set of regions that are substantially identical to one another, and the overlaps between the set of regions. The scanning plan may be provided to an OWI system which inspects a set of dies fabricated based on the circuit design. A scan result may be received from the OWI system based on inspecting a die in the set of dies. A defect location in the die may be identified based on the scan result and the scanning plan.

In some embodiments described herein, each region in the set of regions may have the same size. The set of regions, the regions in the set of regions that are substantially identical to one another, and the overlaps between the set of regions may be stored in a database.

In some embodiments described herein, the scanning plan may instruct the OWI system to compare a first optical signature of a first region in the die with a second optical signature of a second region (which may be a reference region) in the die. The OWI system may report a defect in the first region of the die if the first optical signature does not match the second optical signature.

In some embodiments described herein, the scanning plan may instruct the OWI system to scan a first region and a second region which overlap with one another. In these embodiments, the scan result may include a first result based on scanning the first region and a second result based on scanning the second region. If the first result indicates that the first region has a defect and the second result indicates that the second region does not have a defect, then a portion of the first region which does not overlap with the second region may be identified as the defect location in the die. If the second result indicates that the second region has a defect and the first result indicates that the first region does not have a defect, then a portion of the second region which does not overlap with the first region may be identified as the defect location in the die.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates a process for creating scanning plans for) improving accuracy and resolution of OWI in accordance with some embodiments described herein.

FIGS. 4A-4E illustrate a scanning plan to improve accuracy and resolution of OWI in accordance with some embodiments described herein.

DETAILED DESCRIPTION

Figure 2:
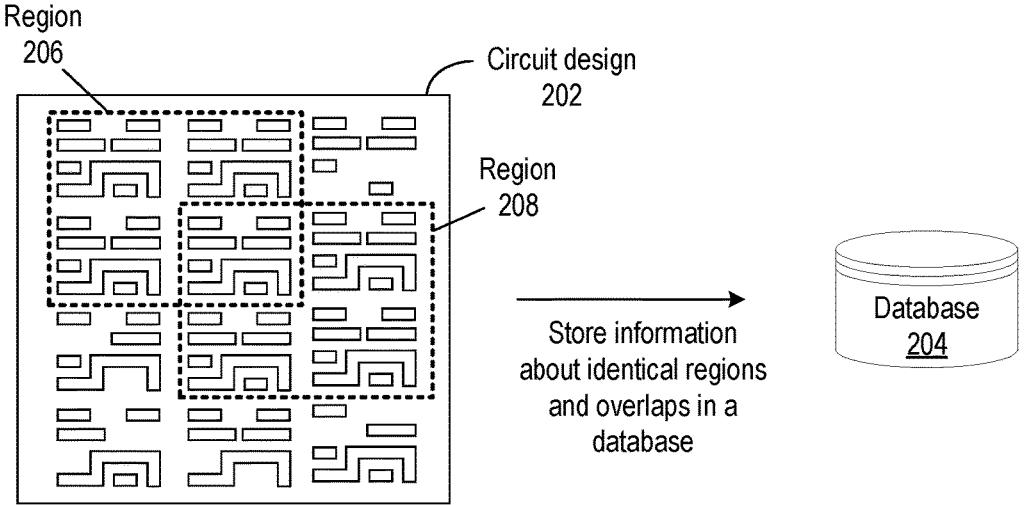
FIG. 2 illustrates repetitions and overlaps in a circuit design in accordance with some embodiments described herein.

Aspects of the present disclosure relate to creating scanning plans for improving accuracy and resolution of OWI. During semiconductor manufacturing, a wafer goes through multiple processing stages. The results after one or more processing stages may be inspected using OWI. In this disclosure, the term "defect" may refer to a deviation (which is greater than a tolerance amount) between a printed pattern on a wafer and a design intent, and which is detected by OWI.

An image of the wafer may be captured using optical or electron beam techniques, and image processing techniques may be used to detect defects. In some approaches, an OWI system may compare a first image of a first area in a first die with a second image of a corresponding second area in a second die. A defect may be detected if the images do not match with each other, e.g., if a difference between the two images is greater than a tolerance. For example, suppose a space is supposed to exist between two layout shapes in the design intent, and the second image is a reference image which includes correctly printed features. Further, suppose the first image does not have a space between the two layout shapes. The OWI system may indicate that a defect exists in the first area in the first die where the space was expected. In these approaches, the OWI system may store image data for an entire die (which may be a large amount of image data) to enable the OWI system to perform comparison between corresponding areas in different dies. Moreover, in these approaches, the OWI system may make large movements back-and-forth between different dies to identify defects, which may increase the amount of time used for inspection. It is desirable to reduce the amount of image data that is stored for detecting defects and the amount of movement.

The resolution of an OWI system may refer to the smallest area within which the OWI system is able to identify defects. For example, if an OWI system has a resolution of 75×75 nm$^2$, then the OWI system may be able to scan a 75×75 nm$^2$ area and detect whether the scanned area has one or more defects. The resolution of an OWI system may be limited by the optics and the hardware used in the OWI system. It is desirable to increase the resolution (i.e., reduce the area within which one or more defects can be detected) of an OWI system without modifying the optics and the hardware used by the OWI system.

Embodiments disclosed herein may create scanning plans which reduce the amount of image data stored to detect defects by the OWI system, reduce the amount of movement needed to detect defects by the OWI system, and improve the resolution of the OWI system. Specifically, embodiments described herein may identify substantially identical regions in a circuit design. Defects may be detected by an OWI system by comparing images of two substantially identical regions in the same die, instead of comparing images of corresponding areas in two different dies. Defect detection accuracy may be increased because two substantially identical regions in the same die may be compared using a tighter tolerance (because the tolerance does not need to account for variations which may exist between different dies).

In some embodiments, overlapping regions may be identified in the circuit design. The overlapping regions may or may not be identical to one another. A scanning plan may be created which instructs the OWI system to scan the overlapping regions in the die. The scan results from the overlapping regions may be used to substantially increase the resolution of the OWI system Technical advantages of embodiments described herein include, but are not limited to, reducing the amount of image data required for defect detection, reducing the amount of movement required for defect detection, increasing the accuracy of defect detection, and increasing the resolution of defect detection.

FIG. 1 illustrates a process for creating scanning plans for improving accuracy and resolution of OWI in accordance with some embodiments described herein.

A circuit may be partitioned into a set of regions (at 102). Regions of the set of regions that are identical to one another may be identified (at 104). It is appreciated that identical also includes substantially identical (e.g., having patterns that are similar within a threshold level) without deviating from the scope of the present disclosure. In some embodiments described herein, the circuit design may be partitioned into a set of equal-sized regions (which may overlap with each other), and the equal-sized regions may be compared with each other to determine if the equal-sized regions are identical to one another. For example, a fixed-sized bounding box may be placed at a set of polygon corners, and the patterns within the bounding box may be compared to identify identical regions in the circuit design. Overlaps between the set of regions may be determined (at 106). The set of regions, the regions in the set of regions that are identical to one another, and the overlaps between the set of regions may be stored in a database (at 108). Steps 102 through 108 may be performed once for each circuit design.

FIG. 2 illustrates repetitions and overlaps in a circuit design in accordance with some embodiments described herein.

Circuit design 202 may include patterns which are desired to be printed on a silicon wafer. Some regions may be identical to one another. Some regions may overlap with one another. For example, region 206 and region 208 may be identical (i.e., these two regions may include the same set of patterns), and may overlap with one another. Identical regions (e.g., region 206 and region 208) in circuit design 202 may be identified. It may be determined which regions overlap with each other (e.g., region 206 and region 208 overlap with each other). The information about identical regions and the overlaps between the regions may be stored in database 204.

Figure 3:
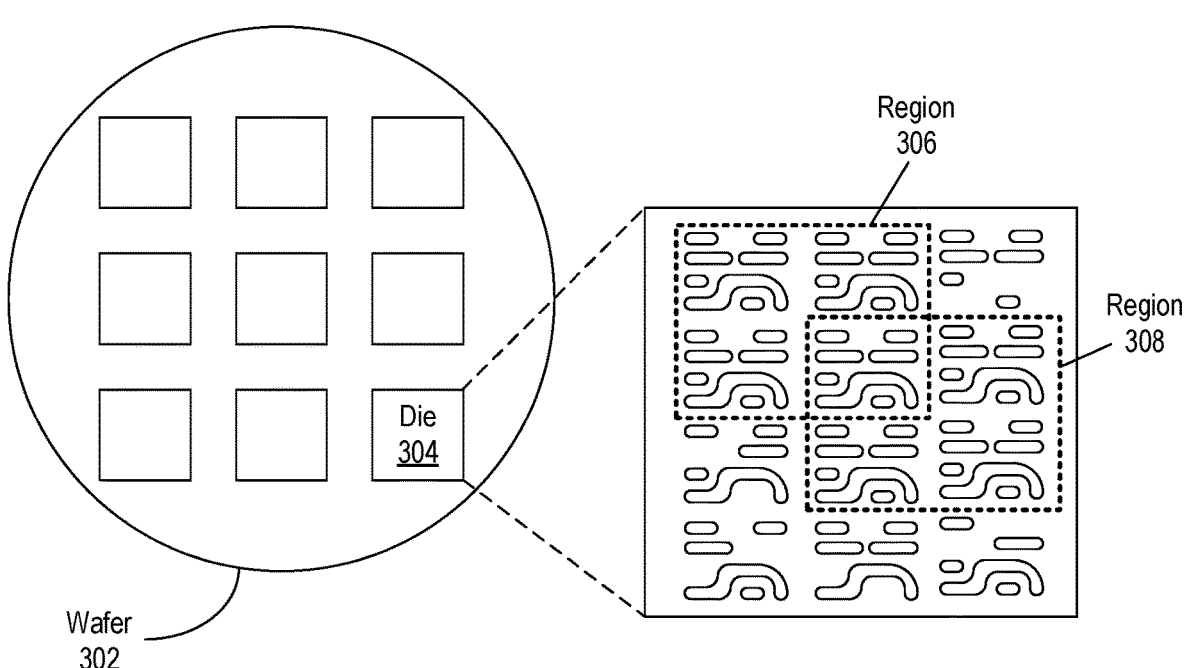
FIG. 3 illustrates dies in a wafer which are fabricated based on a circuit design in accordance with some embodiments described herein.

FIG. 3 illustrates dies in a wafer which are fabricated based on a circuit design in accordance with some embodiments described herein.

Wafer 302 may include multiple dies, such as die 304. Each die (e.g., die 304) may include features which are printed based on a circuit design. For example, die 304 may include features that are printed based on circuit design 202, where features in regions 306 and 308 of die 304 may correspond to the polygons in regions 206 and 208 of circuit design 204, respectively.

Referring to FIG. 1, a scanning plan may be created based on the set of regions, the regions in the set of regions that are identical to each other, and the overlaps between the set of regions (at 110). Specifically, information stored in database 204 may be used to create scanning plans for an OWI system. The scanning plan may be provided to an OWI system which inspects a set of dies fabricated based on the circuit design (at 112).

In some embodiments described herein, the scanning plan may instruct the OWI system to compare a first optical signature of a first region in the die with a second optical signature of a second region (which may be a reference region) in the die, where the OWI system may report a defect in the first region of the die if the first optical signature does not match the second optical signature. An optical signature may generally refer to the scan data obtained by an OWI system. For example, an optical signature may refer to a digital image (e.g., a bitmap) captured using optical or electron beam techniques. A region may be specified as a reference region to the OWI system which includes correctly printed features. The OWI system may detect defects by comparing the optical signature of a given region with the optical signature of the reference region.

A scan result may be received from the OWI system based on inspecting a die in the set of dies (at 114). A defect location may be identified in the die based on the scan result and the scanning plan (at 116). Steps 110 through 116 may be performed once for each wafer (which may include a set of dies).

In some embodiments described herein, the scanning plan may instruct the OWI system to scan a first region and a second region in the die which overlap with each other. In these embodiments, the scan result may include a first result based on scanning the first region and a second result based on scanning the second region. If the first result indicates that the first region has a defect and the second result indicates that the second region does not have a defect, then the defect location may be in a portion of the first region which does not overlap with the second region. If the second result indicates that the second region has a defect and the first result indicates that the first region does not have a defect, then the defect location may be in a portion of the second region which does not overlap with the first region.

FIGS. 4A-4E illustrate a scanning plan to improve accuracy and resolution of OWI in accordance with some embodiments described herein.

A circuit design may include patterns 400, where each hatched square represents an area with a set of polygons. As an example, each hatched square may have dimensions of 20 nm×20 nm, and the space between two adjacent hatched squares may be 5 nm. Each location may be identified by a coordinate. For example, the bottom left corner of repetitive patterns 400 may have coordinates (0, 0) and the top right corner may have coordinates (95, 95).

Suppose the resolution of the OWI system is 75×75 nm$^2$, i.e., the OWI system scans a 75×75 nm$^2$ area and detects whether the scanned area has one or more defects. FIGS. 4B-4E illustrate four regions 402, 404, 406, and 408 which overlap with each other and which are 75×75 nm$^2$ in size. Each region may be represented using the coordinates of the bottom left corner of the region. Thus, the region 402 in FIG. 4B may be represented by coordinates (0, 0), the region 404 in FIG. 4C may be represented by coordinates (30, 0), the region 406 in FIG. 4D may be represented by coordinates (0, 30), and the region 408 may be represented by coordinates (30, 30).

Figure 4A:
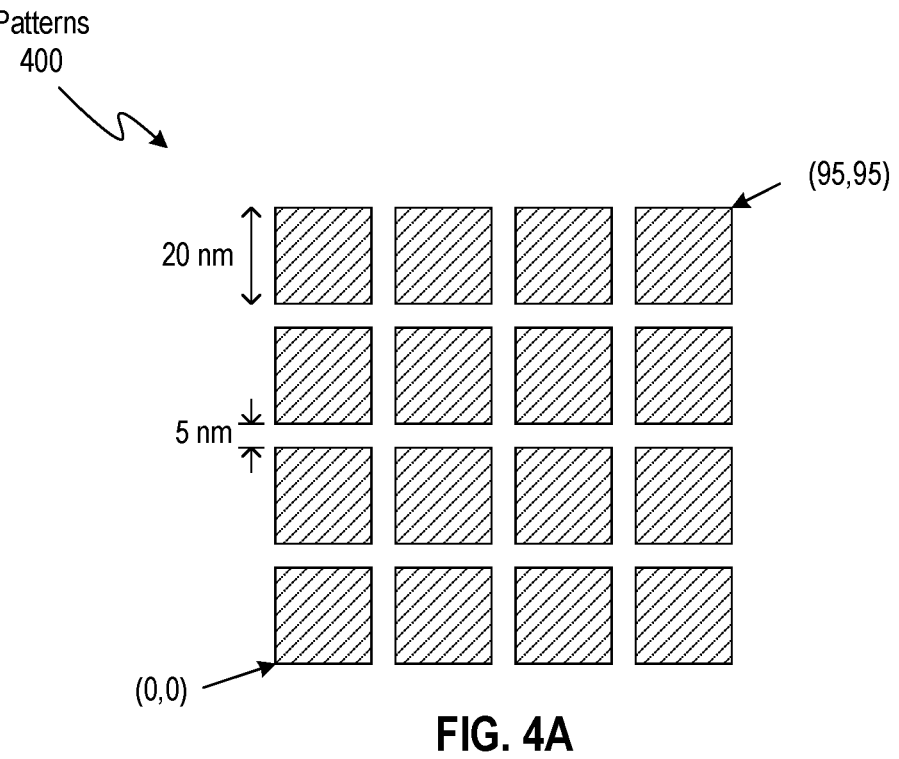
Figure 4B:
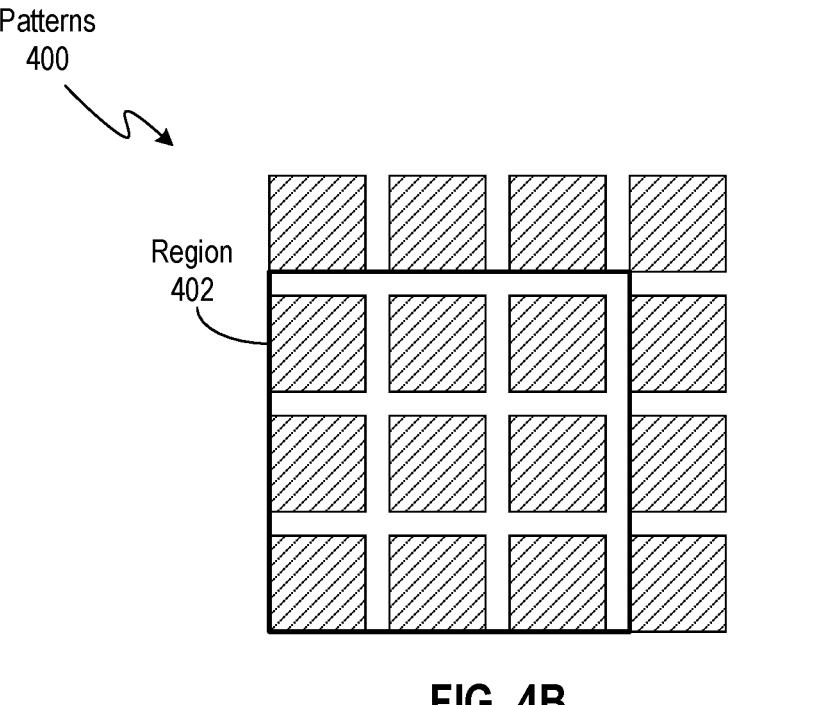
Figure 4E:
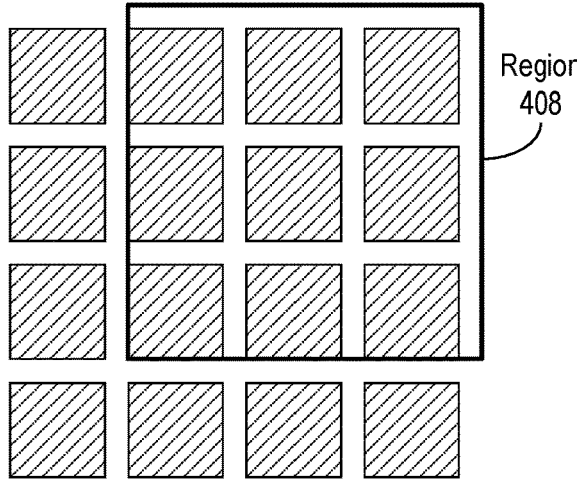
Figure 4F:
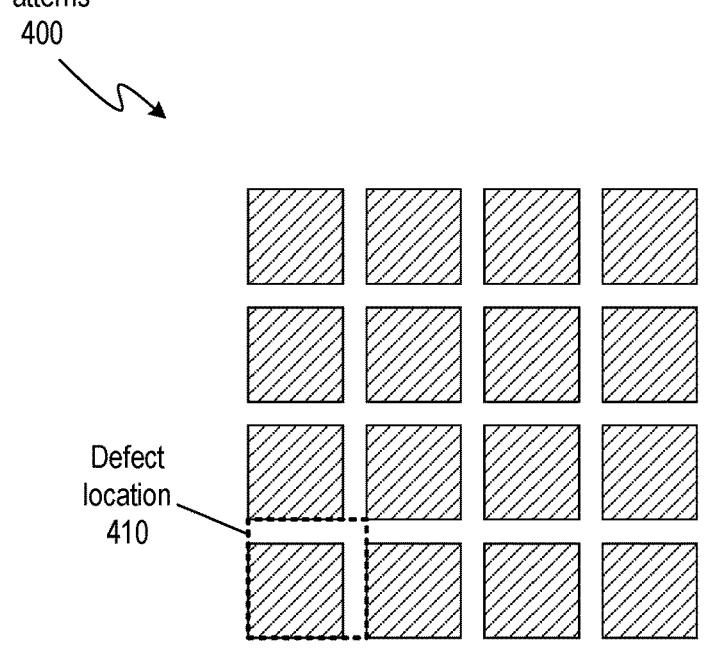
FIG. 4F illustrates a result of applying a scanning plan in accordance with some embodiments described herein.

FIG. 4F illustrates a result of applying a scanning plan in accordance with some embodiments described herein.

The scan results from the overlapping regions 402, 404, 406, and 408 may be used to identify a defect location that is in an area that is substantially smaller than the resolution of the OWI system. Specifically, defects may be detected in a region (e.g., regions 402, 404, 406, and 408) by comparing the optical signature of the region with the optical signature of a reference region (not shown in FIGS. 4A-4F) within the same die. Suppose the scan result for region 402 reports one or more defects, but the scan results for regions 404, 406, and 408 indicate that there are no defects. In this example, the defect location 410 shown in FIG. 4F may be identified based on the scan results from regions 402, 404, 406, and 408. Specifically, areas of region 402 which overlap with other regions that do not have defects may be subtracted from region 402, and the remaining area within region 402 may be identified as the defect location. In this example, the size of the defect location 410 is 30×30 nm$^2$, which is substantially smaller than the OWI resolution (i.e., 75×75 nm$^2$).

Figure 5A:
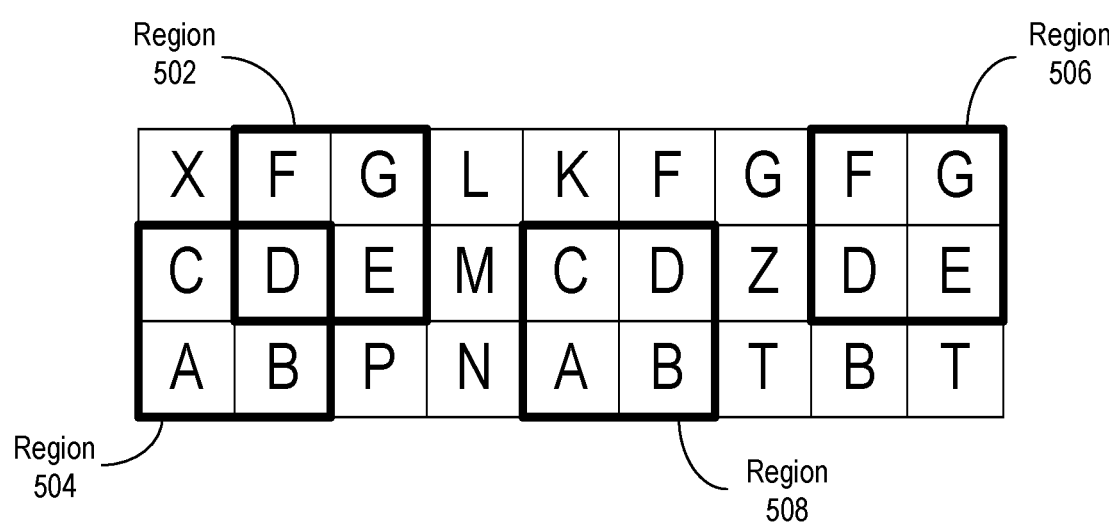
FIG. 5A illustrates a scanning plan to improve accuracy and resolution of OWI in accordance with some embodiments described herein.

FIG. 5A illustrates a scanning plan to improve accuracy and resolution of OWI in accordance with some embodiments described herein.

Each square with a letter represents a specific pattern (i.e., a set of polygons) in a circuit design. Region 502 may include patterns F, G, D, and E, and region 504 may include patterns C, D, A, and B. Regions 502 and 504 may overlap (e.g., as shown in FIG. 5A, pattern D may be common to regions 502 and 504). Region 506 may be identical to, and the reference region for, region 502. Region 508 may be identical to, and the reference region for, region 504. A scanning plan may instruct an OWI system to compare the optical signature of region 502 with the optical signature of region 506, and compare the optical signature of region 504 with the optical signature of region 508.

Figure 5B:
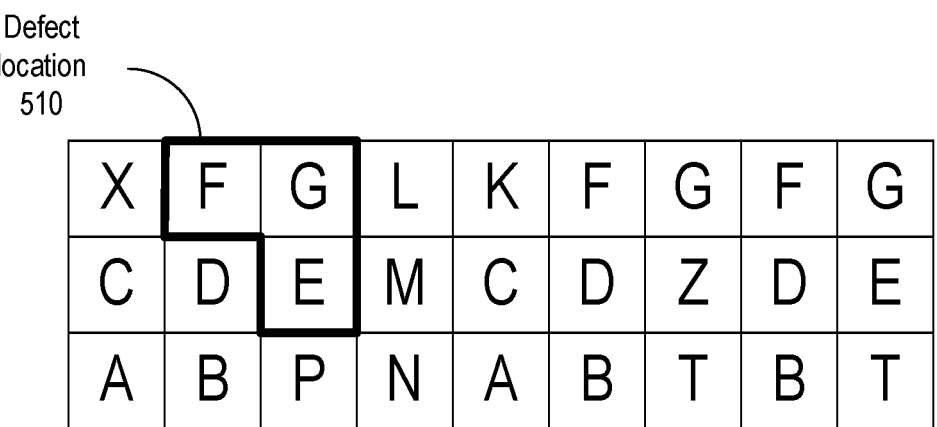
FIG. 5B illustrates a result of applying a scanning plan in accordance with some embodiments described herein.

FIG. 5B illustrates a result of applying a scanning plan in accordance with some embodiments described herein.

Suppose the optical signature of region 502 does not match the optical signature of region 506, but the optical signature of region 504 matches the optical signature of region 508. Thus, region 502 may include one or more defects, but region 504 does not include any defects. Some embodiments described herein may subtract the overlapping region between region 502 and region 504 from the region 502 to identify defect location 510 where one or more defects exist. It is noted that defect location 510 is smaller than regions 502.

Figure 6:
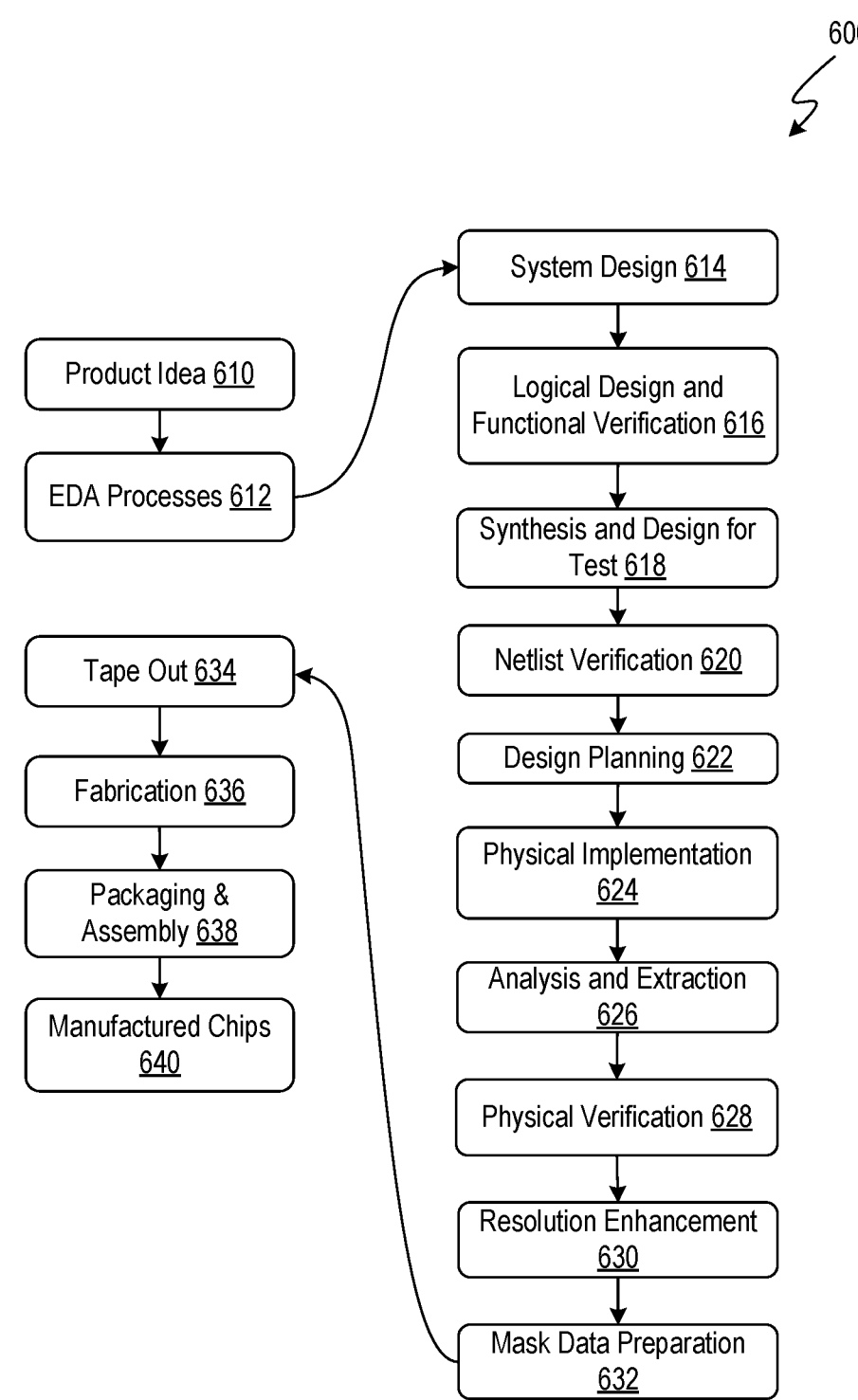
FIG. 6 illustrates an example set of processes used during the design, verification, and fabrication of an article of manufacture such as an integrated circuit to transform and verify design data and instructions that represent the integrated circuit.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
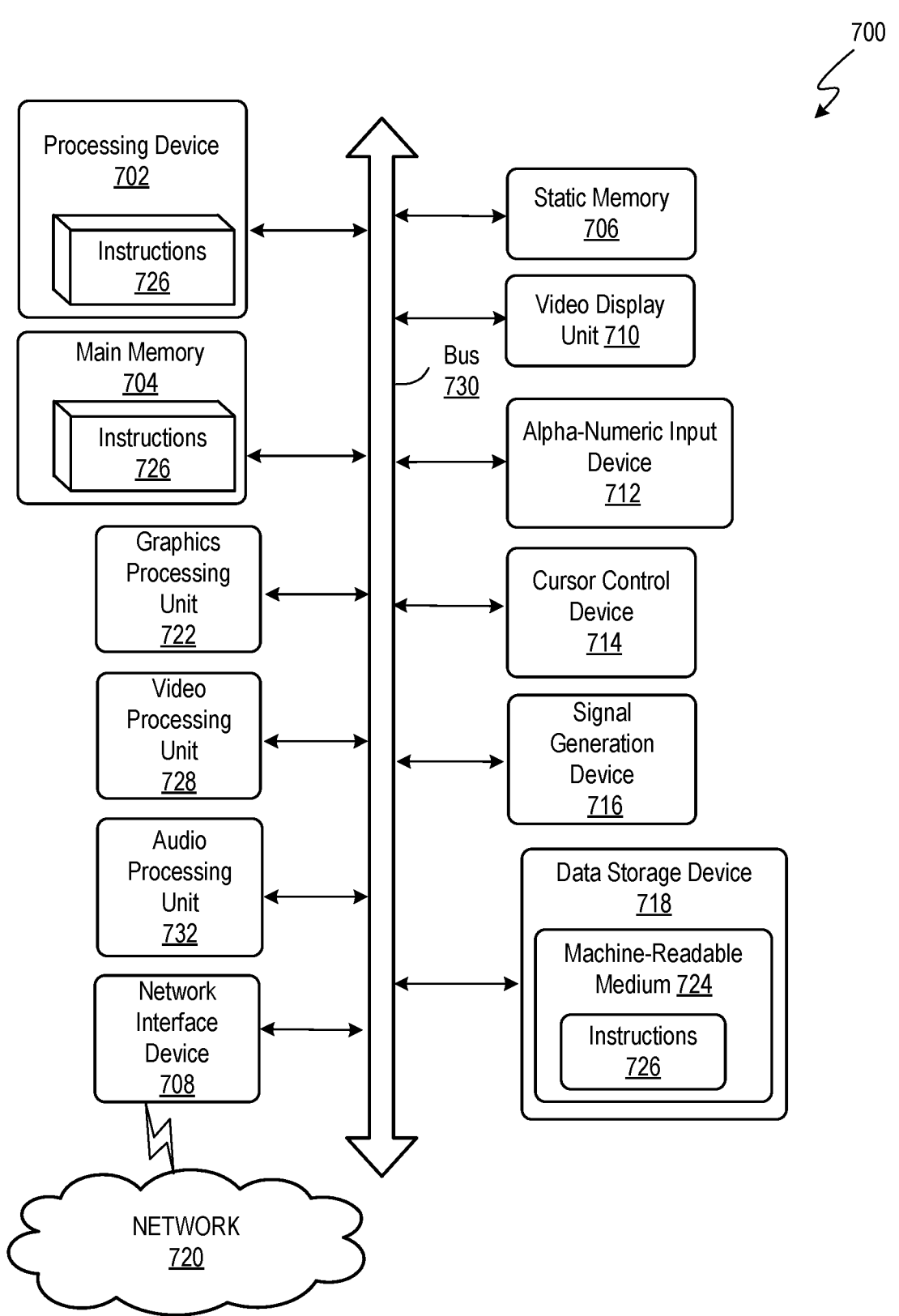
FIG. 7 illustrates an example machine of a computer system within which a set of instructions, for causing the machine to perform any one or more of the methodologies discussed herein, may be executed.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    partitioning a circuit design into a set of regions;
    identifying regions in the set of regions that are substantially identical to one another;
    determining overlaps between the set of regions;
    creating a scanning plan based on the set of regions, the regions in the set of regions that are substantially identical to one another, and the overlaps between the set of regions;
    providing the scanning plan to an optical wafer inspection (OWI) system which inspects a set of dies fabricated based on the circuit design;
    receiving a scan result from the OWI system based on inspecting a die in the set of dies; and
    identifying, by a processor, a defect location in the die based on the scan result and the scanning plan.

2. The method of claim 1, wherein the scanning plan instructs the OWI system to scan a first region and a second region which overlap with one another.

3. The method of claim 2, wherein the scan result comprises a first result based on scanning the first region and a second result based on scanning the second region.

4. The method of claim 3, wherein the defect location in the die is a portion of the first region which does not overlap with the second region when the first result indicates that the first region has a defect, and the second result indicates that the second region does not have a defect.

5. The method of claim 3, wherein the defect location in the die is a portion of the second region which does not overlap with the first region when the second result indicates that the second region has a defect, and the first result indicates that the first region does not have a defect.

6. A non-transitory computer-readable medium comprising stored instructions, which when executed by a processor, cause the processor to:
    partition a circuit design into a set of regions;
    identify regions in the set of regions that are substantially identical to one another;
    determine overlaps between the set of regions;
    create a scanning plan based on the set of regions, the regions in the set of regions that are substantially identical to one another, and the overlaps between the set of regions;
    provide the scanning plan to an optical wafer inspection (OWI) system which inspects a set of dies fabricated based on the circuit design;
    receive a scan result from the OWI system based on inspecting a die in the set of dies; and
    identify a defect location in the die based on the scan result and the scanning plan.

7. The non-transitory computer-readable medium of claim 6, wherein the scanning plan instructs the OWI system to scan a first region and a second region which overlap with one another.

8. The non-transitory computer-readable medium of claim 7, wherein the scan result comprises a first result based on scanning the first region and a second result based on scanning the second region.

9. The non-transitory computer-readable medium of claim 8, wherein the defect location in the die is a portion of the first region which does not overlap with the second region when the first result indicates that the first region has a defect, and the second result indicates that the second region does not have a defect.

10. The non-transitory computer-readable medium of claim 8, wherein the defect location in the die is a portion of the second region which does not overlap with the first region when the second result indicates that the second region has a defect, and the first result indicates that the first region does not have a defect.

11. An apparatus, comprising:

a memory storing instructions; and a processor, coupled with the memory and to execute the instructions, the instructions when executed causing the processor to:

partition a circuit design into a set of regions;

identify regions in the set of regions that are substantially identical to one another;

determine overlaps between the set of regions;

create a scanning plan based on the set of regions, the regions in the set of regions that are substantially identical to one another, and the overlaps between the set of regions stored in the database;

provide the scanning plan to an optical wafer inspection (OWI) system which inspects a set of dies fabricated based on the circuit design;

receive a scan result from the OWI system based on inspecting a die in the set of dies; and identify a defect location in the die based on the scan result and the scanning plan.

12. The apparatus of claim 11, wherein the scanning plan instructs the OWI system to scan a first region and a second region which overlap with one another.

13. The apparatus of claim 12, wherein the scan result comprises a first result based on scanning the first region and a second result based on scanning the second region.

14. The apparatus of claim 13, wherein the defect location in the die is a portion of the first region which does not overlap with the second region when the first result indicates that the first region has a defect, and the second result indicates that the second region does not have a defect.

15. The apparatus of claim 13, wherein the defect location in the die is a portion of the second region which does not overlap with the first region when the second result indicates that the second region has a defect, and the first result indicates that the first region does not have a defect.

\* \* \* \* \*